(12) United States Patent
Nakamura (10) Patent No.: US 9,939,009 B2
(45) Date of Patent: Apr. 10, 2018

(54) STRUCTURE AND ELECTRONIC APPARATUS

(71) Applicant: FUJITSU LIMITED, Kawasaki-shi, Kanagawa (JP)

(72) Inventor: Yutaka Nakamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 14/973,674

(22) Filed: Dec. 17, 2015

(65) Prior Publication Data

US 2016/0219725 A1    Jul. 28, 2016

(30) Foreign Application Priority Data

Jan. 28, 2015 (JP) ................................ 2015-014161

(51) Int. Cl.

| | |
|---|---|
| H05K 7/10 | (2006.01) |
| F16C 11/04 | (2006.01) |
| G06F 1/16 | (2006.01) |
| G06F 3/14 | (2006.01) |
| G06F 3/147 | (2006.01) |
| H04M 1/02 | (2006.01) |
| H04B 1/3827 | (2015.01) |

(52) U.S. Cl.
CPC .............. *F16C 11/04* (2013.01); *G06F 1/163* (2013.01); *G06F 1/1641* (2013.01); *G06F 3/147* (2013.01); *G06F 3/1446* (2013.01); *H04M 1/0247* (2013.01); *G09G 2300/026* (2013.01); *G09G 2380/02* (2013.01); *H04B 2001/3861* (2013.01); *H04M 1/0216* (2013.01); *H04M 2250/16* (2013.01)

(58) Field of Classification Search
CPC ........ F16C 11/04; G06F 1/163; G06F 1/1641; G06F 3/1446; G06F 3/147; H04M 1/0247
See application file for complete search history.

(56) References Cited

U.S. PATENT DOCUMENTS 7,453,936 B2 * 11/2008 Kondo .................. G06F 1/1616
348/384.1
2010/0064564 A1    3/2010 Bemelmans et al.

FOREIGN PATENT DOCUMENTS

| JP | 2002-528811 | 9/2002 |
|---|---|---|
| JP | 2010-508557 | 3/2010 |
| WO | 00/25193 | 5/2000 |

* cited by examiner

*Primary Examiner* — James Wu
*Assistant Examiner* — Hung Dang
(74) *Attorney, Agent, or Firm* — Fujitsu Patent Center (57) ABSTRACT

A structure includes: a first component having a band-like shape and an elasticity for bending the first component in a first direction such that both ends of the first component approach each other; and a second component, coupled to the first component in a manner that the second component pivots about a rotational axis that lies along an edge in a longitudinal direction of the first component, and having an elasticity for bending the second component in a second direction opposite to the first direction when the first component and the second component are unfolded about the rotational axis.

20 Claims, 11 Drawing Sheets

STRUCTURE AND ELECTRONIC APPARATUS

CROSS-REFERENCE TO RELATED APPLICATION

This application is based upon and claims the benefit of priority of the prior Japanese Patent Application No. 2015-014161, filed on Jan. 28, 2015, the entire contents of which are incorporated herein by reference.

FIELD

The embodiments discussed herein are related to a structure and an electronic apparatus.

BACKGROUND

Various types of portable equipment have been developed. Examples of such portable equipment developed include portable devices in which arithmetic units that execute computer programs to perform arithmetic operations are incorporated, such as notebook personal computers (PCs), cellular phones, and smartphones, as well as wearable devices that may be worn on the body or clothing of the user.

Related art is described in Japanese National Publication of International Patent Application No. 2002-528811 or 2010-508557.

SUMMARY

According to an aspect of the embodiments, a structure includes: a first component having a band-like shape and an elasticity for bending the first component in a first direction such that both ends of the first component approach each other; and a second component, coupled to the first component in a manner that the second component pivots about a rotational axis that lies along an edge in a longitudinal direction of the first component, and having an elasticity for bending the second component in a second direction opposite to the first direction when the first component and the second component are unfolded about the rotational axis.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Large-sized devices are not convenient for the user to wear, whereas devices with reduced sizes offer only limited functionality. For instance, although such devices may employ deformable structures that may be made compact when worn on the body of the user, user convenience may be compromised if the mechanism used to achieve this deformation is cumbersome.

Figure 1:
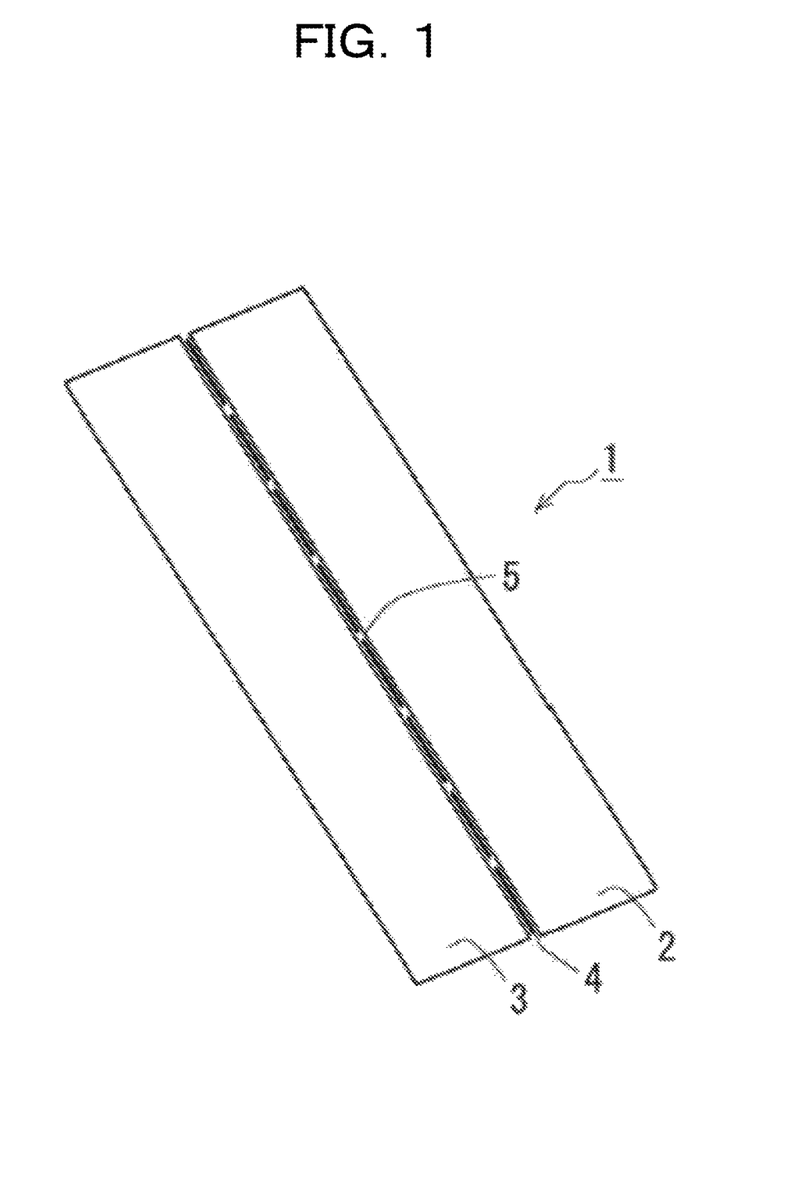
FIG. 1 illustrates an exemplary structure.

FIG. 1 illustrates an exemplary structure. As illustrated as FIG. 1, a structure 1 includes a first member 2 and a second member 3 that have a band-like configuration. The first member 2 may be a flexible band-shaped member having an elasticity that causes the first member 2 to curve in the direction of one side of the first member 2 such that its both ends approach each other. Like the first member 2, the second member 3 may be a flexible band-shaped member having an elasticity that causes the second member 3 to curve in the direction of one side of the second member 3 such that its both ends approach each other. The first member 2 and the second member 3 may be made of various materials capable of elastic deformation. The first member 2 and the second member 3 may each be formed using, as its main material or core material, a spring steel bent such that its both ends approach each other, or an elastic member bent such that its both ends approach each other, for example. The second member 3 is pivotably coupled by a hinge 4 that rotates about a rotational axis that lies along an edge 5 extending along the longitudinal direction of the first member 2.

Figure 2A:
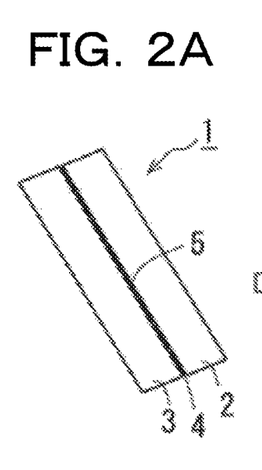
FIGS. 2A to 2C are exemplary exploded views of a structure.
Figure 2B:
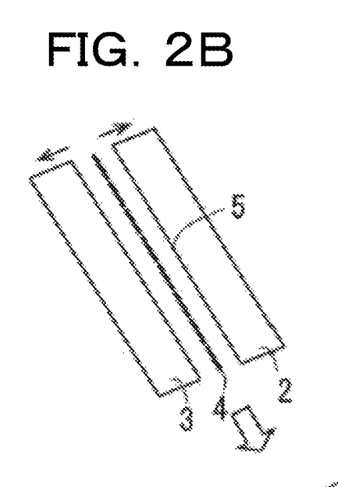
Figure 2C:
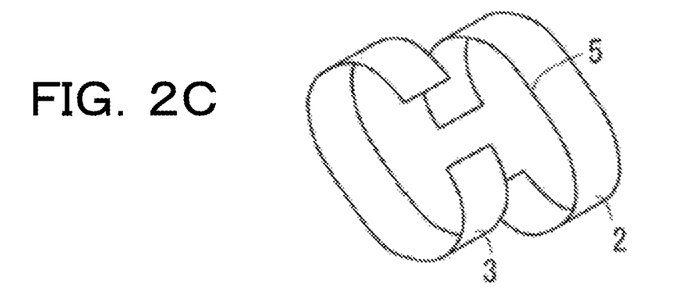

FIGS. 2A to 2C are exemplary exploded views of a structure. FIGS. 2A to 2C illustrate an exemplary state of the first member 2 and the second member 3 when the structure 1 depicted in FIG. 1 is disassembled and the first member 2 and the second member 3 are separated. The first member 2 and the second member 3 each have an elasticity that causes the first member 2 or the second member 3 to curve in the direction of its one side such that its both ends approach each other. Consequently, separating the first member 2 and the second member 3 coupled by the hinge 4 (FIG. 2B) causes each of the first member 2 and the second member 3 to curve into a C-shape (FIG. 2C). For example, the second member 3, which is pivotably coupled to the edge 5 extending along the longitudinal direction of the first member 2 by the hinge 4, is attached to the first member 2 such that, when the first member 2 and the second member 3 are unfolded about the hinge 4, the second member 3 curves in a direction opposite to the first member 2. Consequently, when the first member 2 and the second member 3 coupled by the hinge 4 are unfolded about the hinge 4, the elastic force of the first member 2 and the elastic force of the second member 3 act in opposite directions to balance each other, causing the first member 2 and the second member 3 to become flat (FIG. 2A).

Figure 3A:
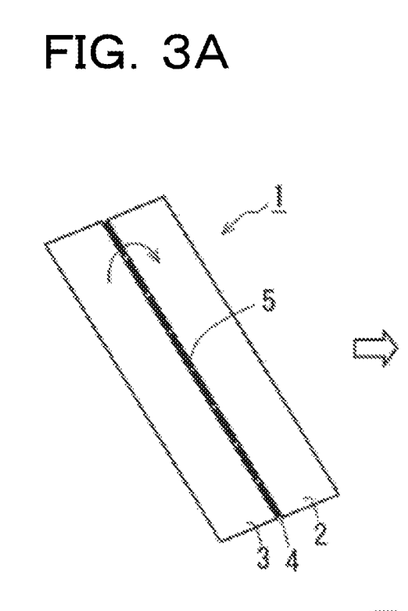
FIGS. 3A to 3C illustrate exemplary deployment of a structure.
Figure 3B:
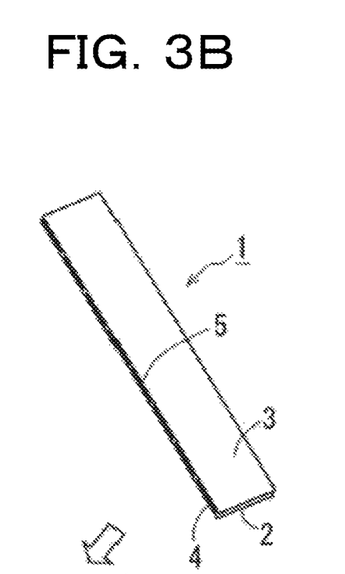
Figure 3C:
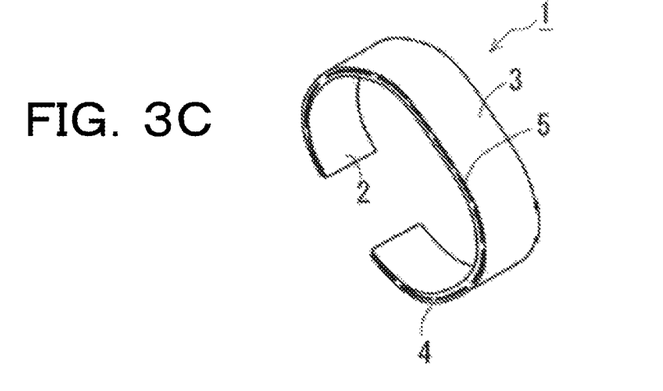

FIGS. 3A to 3C illustrate exemplary deployment of a structure. FIGS. 3A to 3C illustrate exemplary deployment of the structure 1 with the first member 2 and the second member 3 folded over each other about the hinge 4. When the first member 2 and the second member 3 unfolded about the hinge 4 (FIG. 3A) are folded so that the first member 2 and the second member 3 are laid over each other (FIG. 3B), the first member 2 and the second member 3 of the structure 1 both curve in the same direction (FIG. 3C). As the first member 2 and the second member 3 are laid over each other and both the first member 2 and the second member 3 curve in the same direction, the structure 1 as a whole assumes a configuration curved in a C-shape. The curving of the structure 1 into a C-shape allows the user to wear the structure 1 on his or her arm or foot.

The hinge 4 that couples the first member 2 and the second member 3 may have an elasticity that causes the first member 2 and the second member 3 to unfold about the hinge 4, or may have no elasticity. Examples of a hinge having elasticity include a hinge having a spring steel disposed in a spiral manner around the rotating shaft of the hinge, and a hinge made of a flexible material having elasticity such as rubber.

Figure 4:
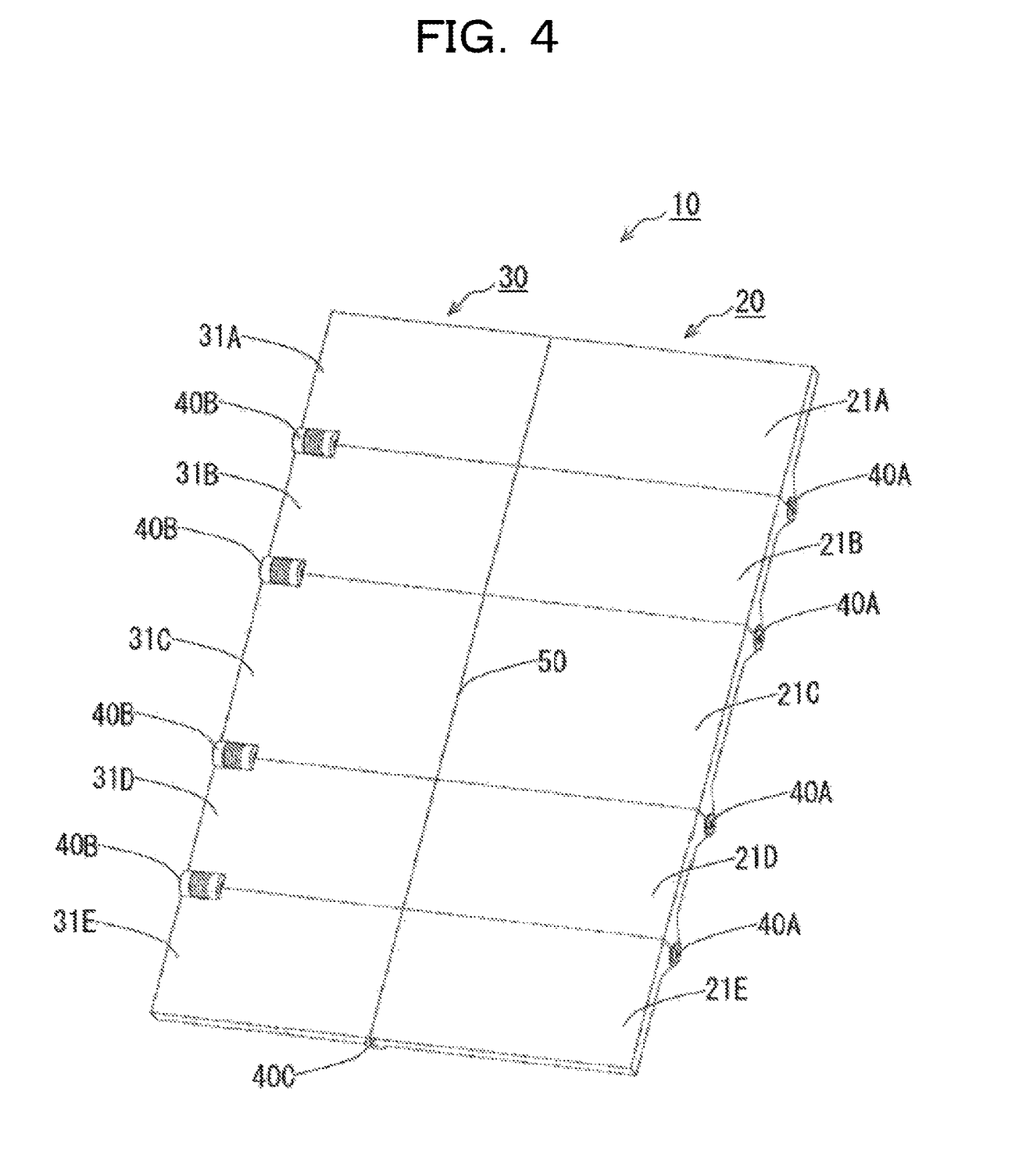
FIG. 4 illustrates an exemplary structure.

FIG. 4 illustrates an exemplary structure. As illustrated as FIG. 4, a structure 10 includes a first member 20 and a second member 30. The first member 20 and the second member 30, which have a band-like configuration, each have the external form of a plate divided into a plurality of segments along the longitudinal direction. The second member 30 may be a plate member that is pivotably coupled by use of a hinge 40C that rotates about a rotational axis that lies along an edge 50 extending along the longitudinal direction of the first member 20.

The first member 20, which has the external form of a plate divided into a plurality of segments along the longitudinal direction, has a plurality of first plate strips 21A, 21B, 21C, 21D, and 21E arranged along the longitudinal direction, and a hinge 40A that couples adjacent divided segments corresponding to the first plate strips 21A, 21B, 21C, 21D, and 21E to each other. The second member 30, which has the external form of a plate divided into a plurality of segments along the longitudinal direction, has a plurality of second plate strips 31A, 31B, 31C, 31D, and 31E arranged along the longitudinal direction, and a hinge 40B that couples adjacent divided segments corresponding to the second plate strips 31A, 31B, 31C, 31D, and 31E to each other.

Figure 5:
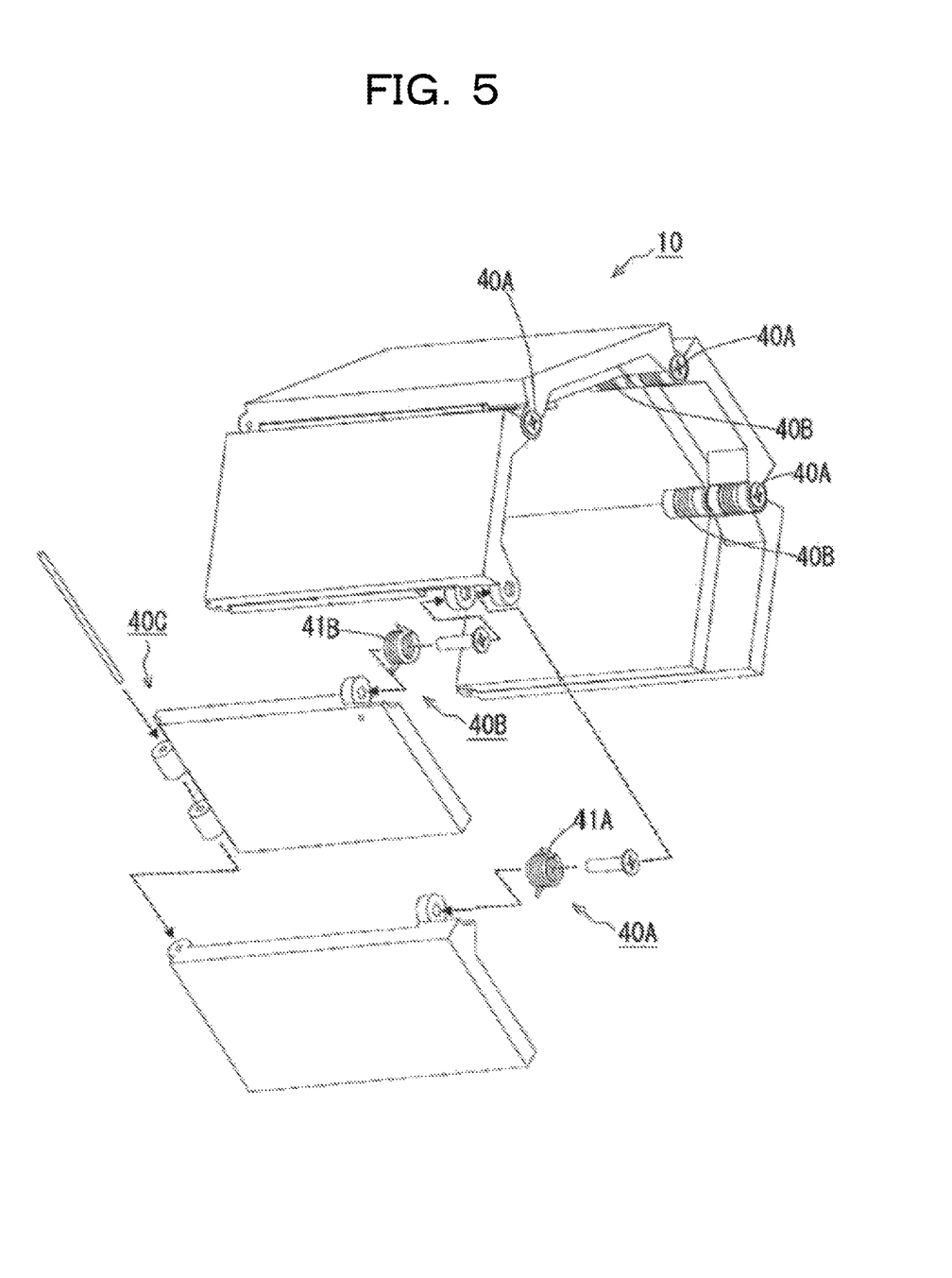
FIG. 5 illustrates an exemplary hinge structure.

FIG. 5 illustrates an exemplary hinge structure. FIG. 5 illustrates an exemplary structure of the hinges 40A, 40B, and 40C depicted in FIG. 4. The hinge 40A, which couples each divided segment of the first member 20, includes a spring 41A that causes the first member 20 to curve in the direction of one side of the first member 20. The hinge 40B, which connects each divided segment of the second member 30, includes a spring 41B that, when the first member 20 and the second member 30 are unfolded about the hinge 40C, causes the second member 30 to curve in a direction opposite to a coupling member such as the hinge 40A of the first member 20.

The hinge 40A, which couples the first plate strips 21A, 21B, 21C, 21D, and 21E to each other, has a rotating shaft whose centerline is located along the edge of either the front or back side of each of the first plate strips 21A, 21B, 21C, 21D, and 21E in such a manner that the range of motion is restricted to the direction of one side of the first member 20. Thus, upon attempting to move the first plate strips 21A, 21B, 21C, 21D, and 21E coupled by the hinge 40A in a direction opposite to the side of the first plate strips 21A, 21B, 21C, 21D, and 21E where the central axis of the rotating shaft of the hinge 40A is located along their edge, the edges of the first plate strips 21A, it becomes a state where 21B, 21C, 21D, and 21E coupled by the hinge 40A come into contact with each other. As the edges of the first plate strips 21A, 21B, 21C, 21D, and 21E coupled by the hinge 40A come into contact with each other, further movement of the first plate strips 21A, 21B, 21C, 21D, and 21E is disabled, thus restricting the range of motion.

Since the range of motion of the hinge 40A is restricted to the direction of one side of the first member 20, the spring 41B of the hinge 40B coupling the second plate strips 31A, 31B, 31C, 31D, and 31E to each other causes the second member 30 to curve with a force greater than the force exerted by the spring 41A of the hinge 40A. This allows the structure 10 to autonomously maintain a flat plate-like configuration as illustrated as FIG. 4 upon unfolding the first member 20 and the second member 30 about the hinge 40C.

Figure 6A:
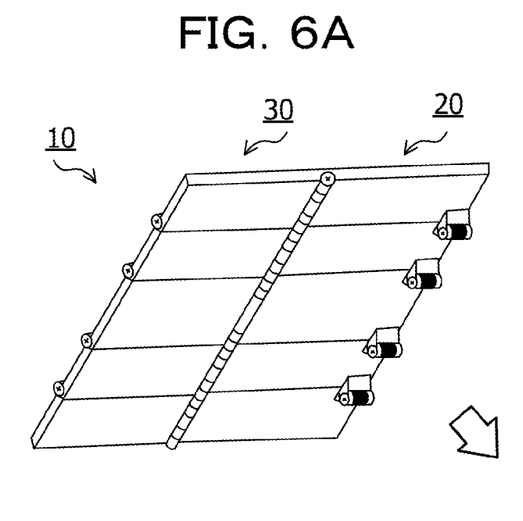
FIGS. 6A to 6D illustrate exemplary deployment of a structure.
Figure 6B:
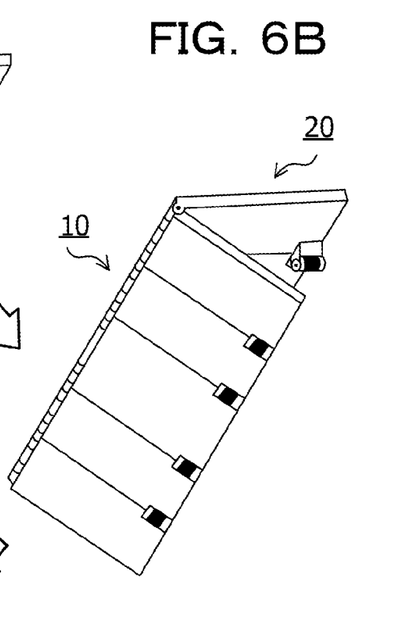
Figure 6C:
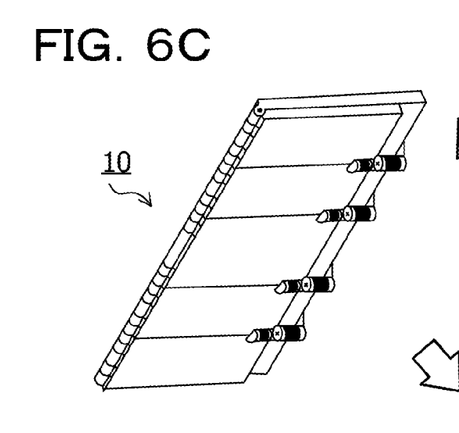
Figure 6D:
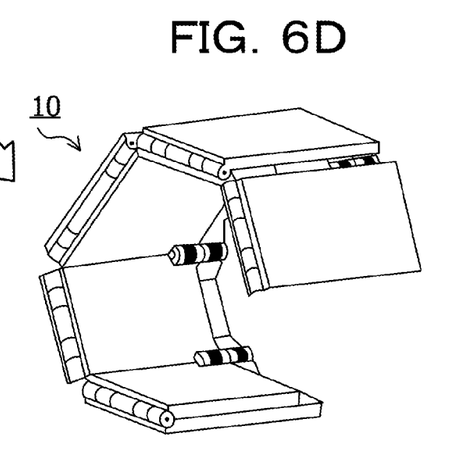

FIGS. 6A to 6D illustrate exemplary deployment of a structure. FIGS. 6A to 6D illustrate exemplary deformation state of the structure 10 when the first member 20 and the second member 30 are folded about the hinge 40C. When the first member 20 and the second member 30 in their unfolded state (FIG. 6A) are folded about the hinge 40C (FIG. 6B), the first member 20 and the second member 30 are laid over each other (FIG. 6C). When the first member 20 and the second member 30 are laid over each other, the first member 20 and the second member 30 both curve in the same direction under the forces of the springs 41A and 41B, respectively. As a result, the structure 10 curves itself with the first member 20 and the second member 30 laid over each other, thereby reducing the size of the structure 10 (FIG. 6D). The structure 10, which is now curved in a C-shape, may be worn on the arm or foot of the user. When desiring to unfold the first member 20 and the second member 30, the user flattens the structure 10 curved in a C-shape, and then unfolds the first member 20 and the second member 30 about the hinge 40C.

Figure 7:
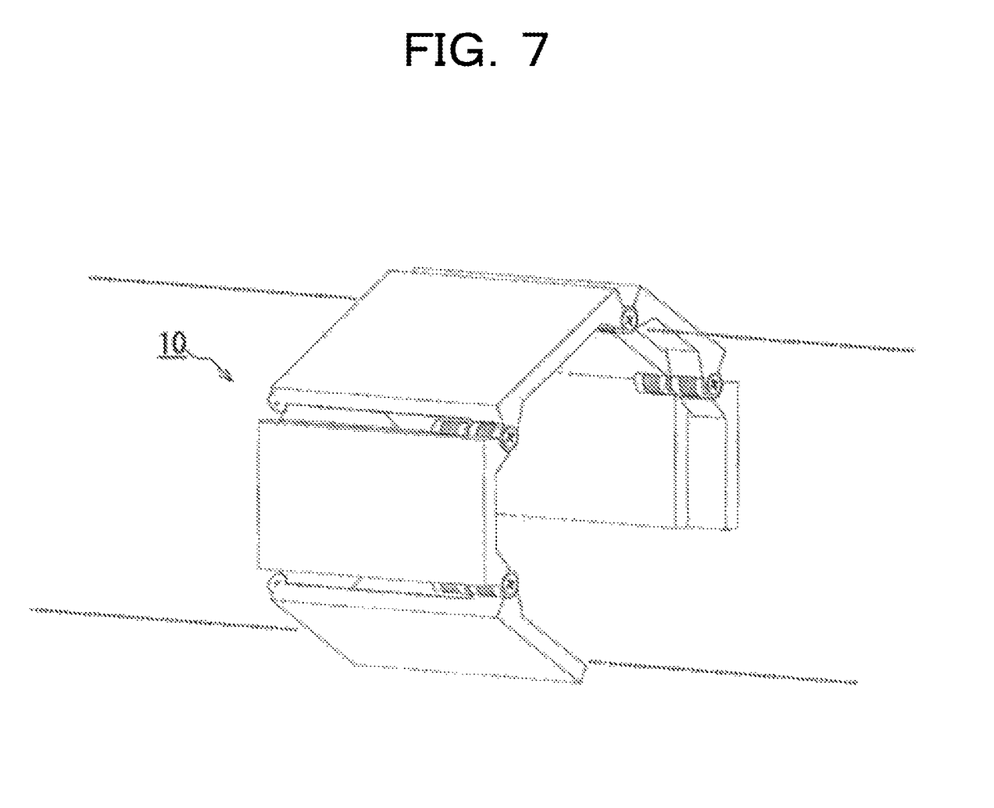
FIG. 7 illustrates an exemplary wearing state of a structure.

FIG. 7 illustrates an exemplary wearing state of a structure. Since the structure 10 curves itself into a C-shape, the structure 10 may be worn on a narrow part of the body such as the wrist like a wristband, for example.

Like the hinge 40A or the hinge 40B, the hinge 40C, which couples the first member 20 and the second member 30, may be provided with a spring to impart the hinge 40C with an elasticity that causes the first member 20 and the second member 30 to unfold about the hinge 40C, for example. If the hinge 40C is provided with a spring for unfolding the first member 20 and the second member 30, the centerline of the rotating shaft of the hinge 40C is preferably located along the edge of either the front or back side of the first member 20 such that the range of motion is restricted to the direction of one side of the first member 20. If the centerline of the rotating shaft of the hinge 40C is located along the edge of either the front or back side of the first member 20, upon attempting to move the second member 30 coupled by the hinge 40C in a direction opposite to the side of the second member 30 where the central axis of the rotating shaft of the hinge 40C is located along its edge, it becomes a state where the edge of the first member 20 and the edge of the second member 30 coupled by the hinge 40C come into contact with each other. As the edge of the first member 20 and the edge of the second member 30 connected by the hinge 40C come into contact with each other, further movement of the second member 30 is disabled, thus restricting the range of motion. If the range of motion of the hinge 40C is restricted to the direction of one side of the first member 20, and the hinge 40C is provided with a spring that allows the first member 20 and the second member 30 to unfold about the hinge 40C, unfolding of the first member 20 and the second member 30 may be facilitated.

Figure 8:
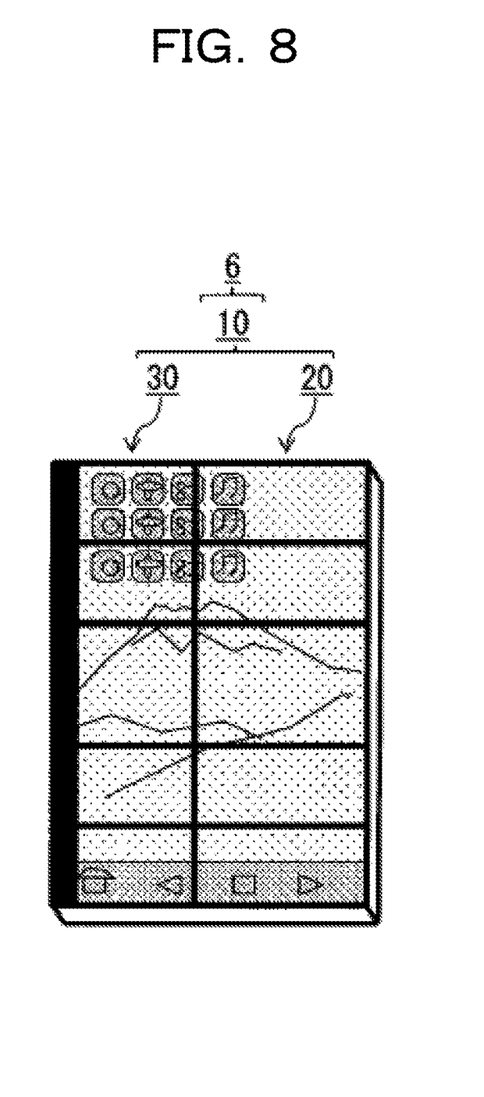
FIG. 8 illustrates an exemplary housing of a smartphone.

The structure 1 or 10 may be used as, for example, the housing of an electronic apparatus. FIG. 8 illustrates an exemplary housing of a smartphone. FIG. 8 is an exemplary external view of the housing of a smartphone with a touch panel disposed over its entire surface, when the structure 10 depicted in FIG. 4 is used as the housing. A smartphone 6 using the structure 10 depicted in FIG. 4 as its housing may be curved into a C-shape for wearing on, for example, the user's arm. As illustrated as FIG. 8, the first member 20 and the second member 30 may be unfolded about the hinge 40C to provide a display screen or touch panel of a size sufficient for use as the smartphone 6.

Figure 9:
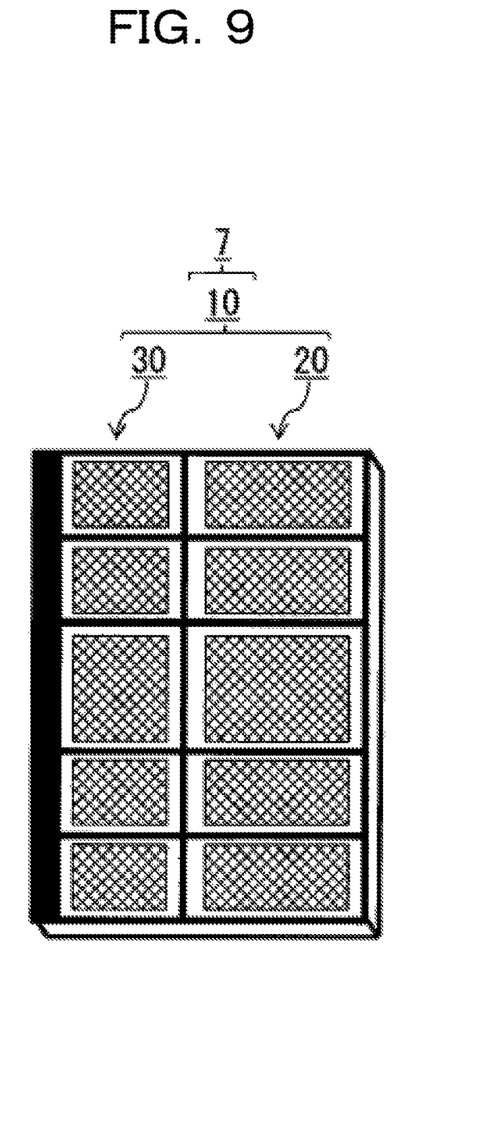
FIG. 9 illustrates an exemplary housing of a solar panel.

The structure 1 or 10 may be used for applications other than as the housing of a smartphone. FIG. 9 illustrates an exemplary housing of a solar panel. FIG. 9 is an exemplary external view of the housing of a solar panel when the structure 10 depicted in FIG. 4 is used as the housing. A solar panel 7 using the structure 10 depicted in FIG. 4 as its housing may be curved into a C-shape for wearing on, for example, the user's arm. To draw electric power from solar energy, the first member 20 and the second member 30 may be unfolded about the hinge 40C to provide a surface area sufficient for use as the solar panel 7 as illustrated as FIG. 9.

Figure 10:
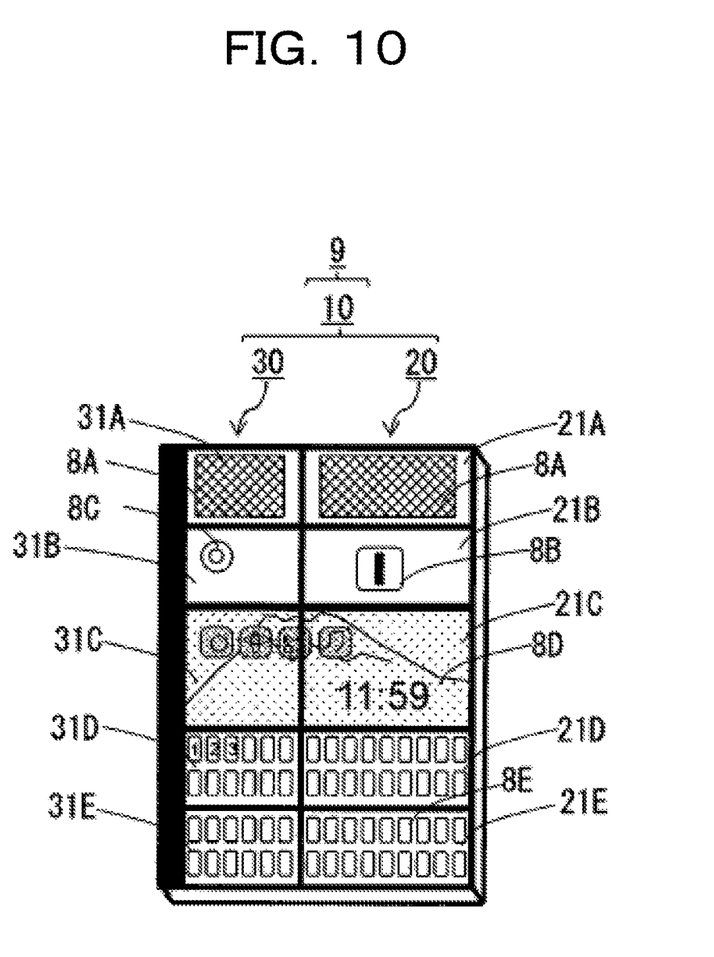
FIG. 10 illustrates an exemplary electronic apparatus.
Figures 11A, 11B:
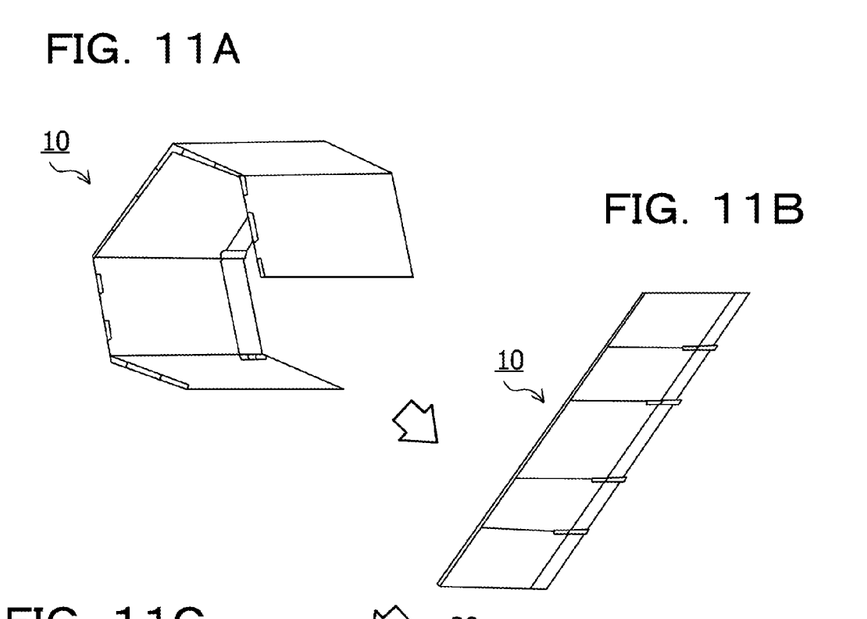
FIGS. 11A to 11D illustrate an exemplary structure.
Figures 11C, 11D:
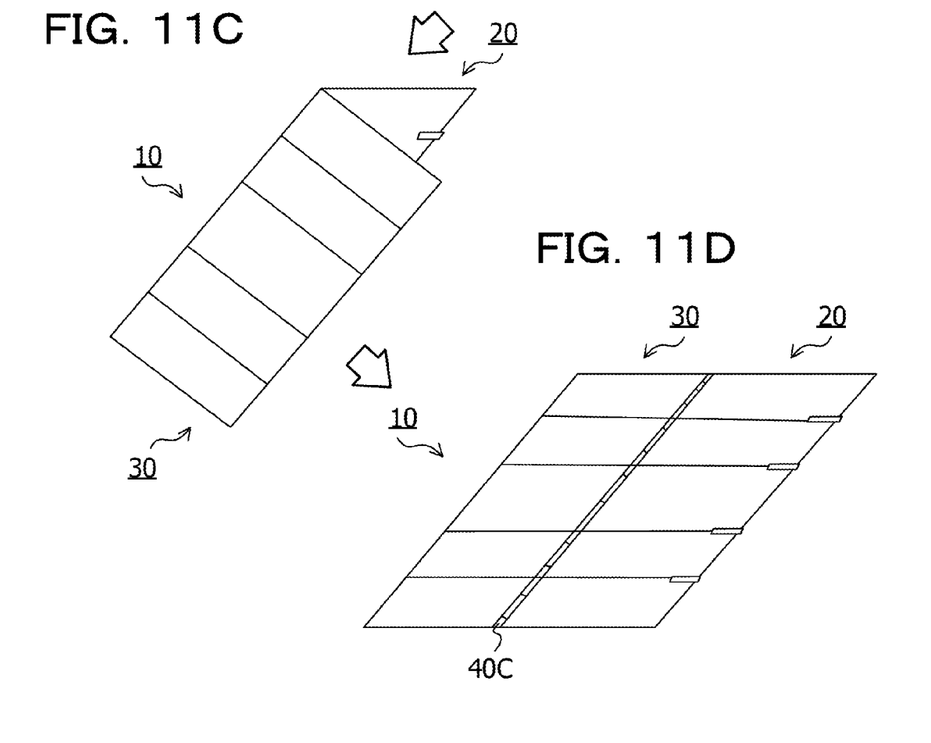

The structure 1 or 10 may be used as, for example, the housing of an electronic apparatus with various electronic components disposed on its surface. FIG. 10 illustrates an exemplary electronic apparatus. FIG. 10 is an exemplary external view of an electronic apparatus with various electronic components disposed on the surface of the structure 10 depicted in FIG. 4. When the structure 10 depicted in FIG. 4 is used as a housing, various electronic components may be disposed on the first plate strips 21A, 21B, 21C, 21D, and 21E and the second plate strips 31A, 31B, 31C, 31D, and 31E as illustrated as FIG. 10, for example. For example, FIG. 10 illustrates an electronic apparatus 9 in which a photovoltaic power generating element 8A is disposed on each of the first plate strip 21A and the second plate strip 31A, a fingerprint sensor 8B is disposed on the first plate strip 21B, a camera 8C is disposed on the second plate strip 31B, a touch panel 8D having a display screen is disposed on each of the first plate strip 21C and the second plate strip 31C, and a keyboard 8E is disposed on each of the first plate strips 21D and 21E and each of the second plate strips 31D and 31E.

The smartphone 6, the solar panel 7, and the electronic apparatus 9 may be applied to the structure 10 depicted in FIG. 4 or the structure 1 depicted in FIGS. 1 to 3C. If an electronic apparatus such as a smartphone or a solar panel is implemented using the structure 1, a touch panel, a photovoltaic power generating element, a circuit board or the like which has flexibility may be used. The structure 1 or the structure 10 may be applied to electronic apparatuses such as smartphones and solar panels. Alternatively, the structure 1 or the structure 10 may be adopted for use in, for example, wristwatches, biological sensors, or other various wearable devices.

While the drawings related to the structure 10 depict the first member 20 and the second member 30 that are relatively thick, the first member 20 and the second member 30 may be relatively thin. FIGS. 11A to 11D illustrate an exemplary structure. FIGS. 11A to 11D illustrate the structure 10 having the first member 20 and the second member 30 that are thin. As illustrated as FIGS. 11A to 11D, for example, the structure 10 may have the first member 20 and the second member 30 that are formed to have a small thickness. Reducing the thickness of the structure 10 may reduce the sense of wearing the structure 10 that the user feels upon wearing the structure 10 on his or her body.

Although the first member 20 and the second member 30 of the structure 10 are divided into five segments, the number of divisions may be increased or decreased as appropriate. Although the structure 1 or the structure 10 is provided with two members, for example, the first member 2 or 20 and the second member 3 or 30, the structure 1 or the structure 10 may be provided with three or more members corresponding to the first member 2 or 20 or the second member 3 or 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A structure comprising:
   a first component having a rectangle shape, a first end and a second end in a longitudinal direction of the first component and a first elasticity for bending the first component in a first direction such that both of the first end and the second end approach each other;
   a second component having a rectangle shape, a third end and a fourth end in a longitudinal direction of the second component and a second elasticity for bending the second component in a second direction opposite to the first direction such that both of the third end and the fourth end approach each other; and
   a connecting member configured to couple the second component to the first component in a manner that the second component pivots about a rotational axis that lies along an edge in the longitudinal direction of the first component,
   wherein the first component includes:
   a plurality of first plate strips into which the first component is divided along the longitudinal direction; and
   a plurality of first connecting members each that is provided on a first surface of the first component which corresponds to an internal surface when the first end and the second end approach each other and at a first side of the first component opposite to the connecting member and couples adjacent first plate strips, and
   wherein the second component includes:
   a plurality of second plate strips into which the second component is divided along the longitudinal direction; and
   a plurality of second connecting members each that is provided on a second surface of the second component which corresponds to an internal surface when the third end and the fourth end approach each other and at a second side of the second component opposite to the connecting member and couples adjacent second plate strips,
   wherein the plurality of first connecting members are arranged side by side with the respective second connecting members when the second component pivots to the first component about the rotational axis.

2. The structure according to claim 1, wherein the first component and the second component each comprise a flexible material.

3. The structure according to claim 1, wherein the first component and the second component are laid over each other to assume a C-shaped configuration.

4. The structure according to claim 1, wherein the plurality of first connecting members each includes a first nut projecting from the first surface and a first bolt and a first spring attached to the first nut, and the plurality of second connecting members each includes a second nut projecting from the second surface and a second bolt and a second spring which are attached to the second nut.

5. The structure according to claim 1, wherein the first connecting members causes the first component to bend in the first direction, and wherein the second connecting members causes the second component to bend in the second direction.

6. The structure according to claim 1, wherein a range of motion of the first connecting members is restricted to the first direction.

7. The structure according to claim 1, wherein the second connecting members causes the second component to bend in the second direction with a force greater than a force with which the first component is bent in the first direction, when the first component and the second component are unfolded about the rotational axis.

8. The structure according to claim 1, wherein the first component and the second component are coupled by the connecting member that has a third elasticity for unfolding the first component and the second component about the rotational axis.

9. The structure according to claim 1, wherein the second component is pivotably coupled to the first component by the connecting member having a range of motion restricted to a direction of one side of the first component.

10. The structure according to claim 1, wherein the first component and the second component become flat by the first elasticity and the second elasticity when the first component and the second component are unfolded about the rotational axis.

11. An electronic apparatus comprising:
an electronic component; and
a housing on which the electronic component is disposed, the housing including:
   a first component having a rectangle shape, a first end and a second end in a longitudinal direction of the first component and a first elasticity for bending the first component in a first direction such that both of the first end and the second end approach each other;
   a second component having a rectangle shape, a third end and a fourth end in a longitudinal direction of the second component and a second elasticity for bending the second component in a second direction opposite to the first direction such that both of the third end and the fourth end approach each other; and
   a connecting member configured to couple the second component to the first component in a manner that the second component pivots about a rotational axis that lies along an edge in the longitudinal direction of the first component,
wherein the first component includes:
   a plurality of first plate strips into which the first component is divided along the longitudinal direction; and
   a plurality of first connecting members each that is provided on a first surface of the first component which corresponds to an internal surface when the first end and the second end approach each other and at a first side of the first component opposite to the connecting member and couples adjacent first plate strips, and
wherein the second component includes:
   a plurality of second plate strips into which the second component is divided along the longitudinal direction; and
   a plurality of second connecting members each that is provided on a second surface of the second component which corresponds to an internal surface when the third end and the fourth end approach each other and at a second side of the second component opposite to the connecting member and couples adjacent second plate strips,
   wherein the plurality of first connecting members are arranged side by side with the respective second connecting members when the second component pivots to the first component about the rotational axis.

12. The electronic apparatus according to claim 11, wherein the first component and the second component each comprise a flexible material.

13. The electronic apparatus according to claim 11, wherein the first component and the second component are laid over each other to assume a C-shaped configuration.

14. The electronic apparatus according to claim 11, wherein the plurality of first connecting members each includes a first nut projecting from the first surface and a first bolt and a first spring attached to the first nut, and the plurality of second connecting members each includes a second nut projecting from the second surface and a second bolt and a second spring which are attached to the second nut.

15. The electronic apparatus according to claim 11, wherein the first connecting members causes the first component to bend in the first direction, and wherein the second connecting members causes the second component to bend in the second direction.

16. The electronic apparatus according to claim 11, wherein a range of motion of the first connecting members is restricted to the first direction.

17. The electronic apparatus according to claim 11, wherein the second connecting members causes the second component to bend in the second direction with a force greater than a force with which the first component is bent in the first direction, when the first component and the second component are unfolded about the rotational axis.

18. The electronic apparatus according to claim 11, wherein the first component and the second component are coupled by the connecting member that has a third elasticity for unfolding the first component and the second component about the rotational axis.

19. The electronic apparatus according to claim 11, wherein the second component is pivotably coupled to the first component by the connecting member having a range of motion restricted to a direction of one side of the first component.

20. The electronic apparatus according to claim 11, wherein the first component and the second component become flat by the first elasticity and the second elasticity when the first component and the second component are unfolded about the rotational axis.

* * * * *